United States Patent
Malhotra et al.

(10) Patent No.: US 7,131,238 B2
(45) Date of Patent: Nov. 7, 2006

(54) METHOD OF TESTING SEISMIC BRACES

(75) Inventors: Praveen K. Malhotra, Sharon, MA (US); Paul E. Senseny, Norwood, MA (US); Antonio Carlos M. Braga, Los Angeles, CA (US); Roger L. Allard, North Smithfield, RI (US)

(73) Assignee: FM Global Technologies, LLC, Johnston, RI (US)

( * ) Notice: Subject to any disclaimer, the term of this patent is extended or adjusted under 35 U.S.C. 154(b) by 199 days.

(21) Appl. No.: 10/622,771

(22) Filed: Jul. 21, 2003

(65) Prior Publication Data

US 2005/0016087 A1 Jan. 27, 2005

(51) Int. Cl.
*E04B 1/98* (2006.01)
*E04H 9/02* (2006.01)

(52) U.S. Cl. ........... 52/167.1; 52/167.2; 52/167.3; 52/167.7; 52/167.8; 52/749.1; 73/786; 73/808; 73/579; 73/594; 73/662

(58) Field of Classification Search ........... 52/167.1, 52/167.2, 167.3, 167.4, 167.7, 167.8, 741.1, 52/749.1; 73/784, 786, 808, 862, 579, 594, 73/662, 862.01

See application file for complete search history.

(56) References Cited

U.S. PATENT DOCUMENTS

| | | | |
|---|---|---|---|
| 2,754,679 A * | 7/1956 | Petroff | 73/659 |
| 3,561,322 A * | 2/1971 | Gerstine et al. | 91/1 |
| 3,589,175 A | 6/1971 | Bock et al. | |
| 3,714,854 A * | 2/1973 | Kubacki | 82/101 |
| 3,793,880 A | 2/1974 | Sugi et al. | |
| 3,813,990 A * | 6/1974 | Coppola et al. | 91/1 |
| 3,912,181 A * | 10/1975 | Mullendore | 242/437 |
| 3,963,099 A * | 6/1976 | Skinner et al. | 188/372 |
| 3,964,521 A * | 6/1976 | Kao et al. | 138/176 |
| 3,964,522 A * | 6/1976 | Kao et al. | 242/438 |
| 3,986,808 A | 10/1976 | Keith | |
| 4,065,218 A * | 12/1977 | Biggane | 403/71 |
| 4,078,752 A * | 3/1978 | Kindorf | 248/62 |
| 4,602,555 A * | 7/1986 | Bushey | 92/61 |
| 4,869,111 A | 9/1989 | Ohya et al. | |
| 4,947,341 A | 8/1990 | Shine | |
| 4,950,458 A | 8/1990 | Cunningham | |
| 4,956,822 A * | 9/1990 | Barber et al. | 367/23 |
| 5,024,102 A | 6/1991 | Klock et al. | |
| 5,261,493 A | 11/1993 | Brammer | |
| 5,305,645 A | 4/1994 | Reifsnyder et al. | |
| 5,349,870 A | 9/1994 | Webber et al. | |
| 5,396,804 A | 3/1995 | Moet et al. | |

(Continued)

OTHER PUBLICATIONS

U.S. Appl. No. 11/191,291, Khandhadia et al.

*Primary Examiner*—Jeanette E. Chapman
(74) *Attorney, Agent, or Firm*—Merek, Blackmon & Voorhees, LLC

(57) ABSTRACT

Braces for bracing objects in structures against forces due to earthquakes are tested by subjecting components of the braces for attaching the braces to the object or structure to cyclic loading of approximately 15 cycles. The cyclic forces are applied to different samples of the components at differing angles, and a load rating is determined for each angle. Prior to cyclic testing, forces are applied monotonically to the components in both tension and compression, the flexible loading direction of the component is determined from the monotonic testing, and the deformation that the component can resist when a load is applied in cycles is estimated from the monotonic testing.

35 Claims, 10 Drawing Sheets

U.S. PATENT DOCUMENTS

| | | |
|---|---|---|
| 5,567,867 A | 10/1996 | Nazar |
| 5,641,912 A | 6/1997 | Manahan |
| 5,765,313 A | 6/1998 | Lee et al. |
| 5,899,064 A * | 5/1999 | Cheung .................. 60/406 |
| 6,006,487 A * | 12/1999 | Leek ...................... 52/698 |
| 6,073,493 A | 6/2000 | Sakamoto et al. |
| 6,247,274 B1 * | 6/2001 | Thompson et al. ...... 52/167.1 |
| 6,256,943 B1 * | 7/2001 | Mander et al. ......... 52/167.1 |
| 6,269,733 B1 * | 8/2001 | Reust ..................... 91/415 |
| 6,327,831 B1 * | 12/2001 | Leek ...................... 52/698 |
| 6,332,364 B1 | 12/2001 | Buschmann et al. |
| 6,341,258 B1 | 1/2002 | Inoue et al. |
| 6,530,182 B1 * | 3/2003 | Fanucci et al. ......... 52/167.3 |
| 6,543,077 B1 * | 4/2003 | Ouchi et al. ............ 14/77.1 |
| 6,553,320 B1 | 4/2003 | Roch et al. |
| 6,643,986 B1 * | 11/2003 | Commins et al. ........ 52/483.1 |
| 6,805,377 B1 | 10/2004 | Krupp et al. |
| 2005/0104349 A1 | 5/2005 | Stevens |
| 2005/0116454 A1 | 6/2005 | Stevens et al. |
| 2005/0151358 A1 | 7/2005 | Burns |
| 2005/0200103 A1 | 9/2005 | Burns et al. |
| 2005/0218637 A1 | 10/2005 | Burns |
| 2005/0218638 A1 | 10/2005 | Burns et al. |

* cited by examiner

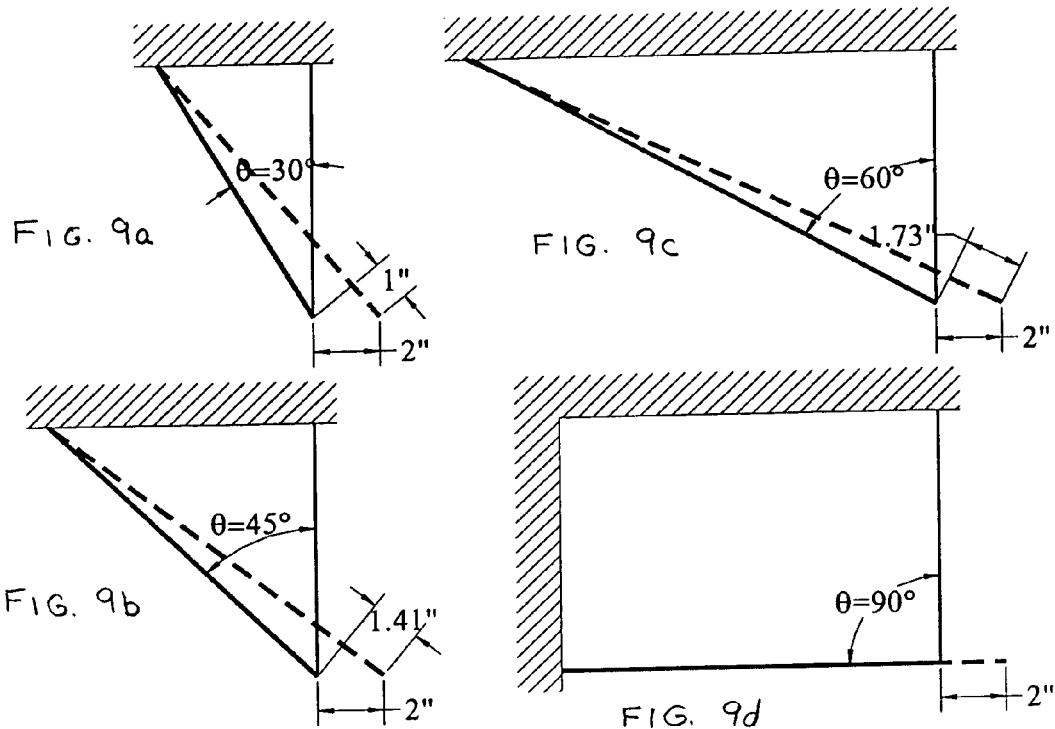
FIG. 9a
FIG. 9b
FIG. 9c
FIG. 9d
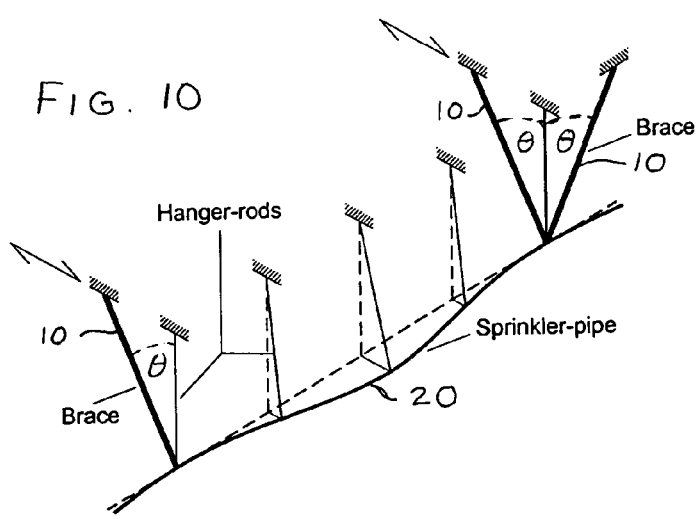
FIG. 10

METHOD OF TESTING SEISMIC BRACES

BACKGROUND OF THE INVENTION

The present invention relates to a method of testing braces designed to restrain objects relative to a fixed structure during an earthquake, for example, to restrain sprinkler pipes in a building.

Design codes and standards (e.g., Uniform Building Code, International Building Code, NFPA-13 (National Fire Protection Association)) estimate the amplitude of the seismic load in sprinkler-pipe braces, but they do not specify the number of cycles for which this load must be resisted by various components of pipe braces.

The sprinkler pipes in a building are typically supported from the roof or the floor above by hanger rods that are designed to transfer the gravity load from the pipes to the supporting structure. In seismic regions, the pipes need to be restrained laterally and longitudinally at discrete locations along their length by seismic braces. In an earthquake, inadequately restrained sprinkler piping can suffer damage by large differential movement within the piping or by impacts with adjacent structural and nonstructural components. In the past, seismic damage to sprinkler pipes has been in the form of broken sprinkler heads, failed couplings and fittings, unseated hanger-rods and broken braces. To perform their function, the seismic braces must resist the dynamic load imposed by the vibrating sprinkler-pipe without breaking or deforming excessively.

Design codes and standards estimate the amplitude of the seismic load, but they do not estimate the number of cycles for which the load is applied.

SUMMARY OF THE INVENTION

Because the components can fail in low-cycle fatigue, the number of load cycles must be considered in establishing the strength of the brace components. By the present invention, the number of cycles for which a component must resist its rated capacity is determined. Strong-motion records from 18 severely shaken buildings were incorporated into a low-cycle fatigue model to develop a test criterion for measuring the seismic strength of brace components. In addition, a series of tests was conducted to gain insight into the cyclic behavior of brace components. Furthermore, a test protocol was established to measure the seismic strength of brace components. The protocol can be applied to many other non-structural components.

By the present invention, both the amplitude of the load on seismic braces and the number of load cycles are taken into consideration in establishing the seismic strength of the braces. The number of cycles for which a brace component must resist the seismic load is determined, a series of tests to gain insight into the cyclic behavior of brace components is conducted, and a protocol for determining the seismic-strength of brace components is established.

Strong-motion records from severely shaken buildings are incorporated into a low-cycle fatigue model to develop a simple, yet rational protocol for determining the seismic strength of sprinkler pipe sway-brace components. The protocol essentially determines the load a component can resist for 15 cycles without breaking or deforming more than a certain value derived from clearance requirements.

Tests have shown that the brace components can exhibit significant degradation in strength, stiffness, and energy dissipation under cyclic conditions.

The failure modes in cyclic tests can be significantly different from those in monotonic tests. In other words, cyclic tests reveal weaknesses that are not apparent in the monotonic tests.

From the analysis of test results, it has been found that friction-based components should be tested at 3 Hz to obtain a conservative load rating, whereas nonfriction-based components should be tested at 0.1 Hz to obtain a conservative load rating.

BRIEF DESCRIPTION OF THE DRAWINGS

FIG. 2($b$) shows the horizontal deformation in a brace supporting a 40-foot length of a 2.5-inch water-filled steel pipe subjected to the motion shown in FIG. 2($a$), where the horizontal stiffness of the brace is assumed to be 1 kip/inch;

FIGS. 9($a$)–9($d$) show the brace deformation corresponding to a 2-inch horizontal displacement of sprinkler pipe for various angular orientations of the brace;

FIG. 10 is an isometric view of a segment of sprinkler pipe supported by hanger rods and restrained in the lateral and longitudinal directions by seismic braces;

FIG. 14($b$) shows force-deformation plots for the last three of 15 cycles for a pipe-attached subassembly tested at 0.1 Hz and 5 Hz at a 90° orientation;

DETAILED DESCRIPTION OF THE PREFERRED EMBODIMENTS

The following description is written in terms of sprinkler pipes in a building, but the present invention also encompasses objects other than sprinkler pipes and fixed structures other than buildings.

Figure 1:
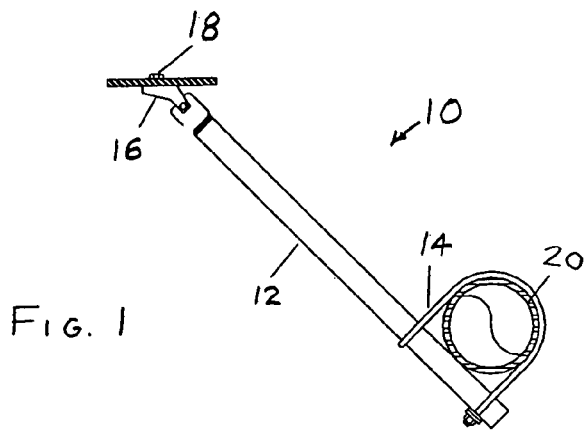
FIG. 1 is a schematic front view of a brace bracing a sprinkler pipe supported in a building by hanger rods that are not shown.

The components of a "rigid" seismic brace 10 are shown in FIG. 1. These are a brace pipe 12, a pipe-attached component 14, a building-attached component 16, including a fastener 18. The pipe-attached component 14 is attached to a sprinkler pipe 20. The pipe-attached component 14, the building-attached component 16, or both can comprise a single member, a plurality of inseparable members, or a subassembly of separable members. The deformation history for the brace 10 can be obtained by dividing the force history by the stiffness of the brace assembly. Under strong shaking, the seismic loads are so large that the brace 10 is likely to yield. Its stiffness, therefore, depends on the applied load.

Figure 2A:
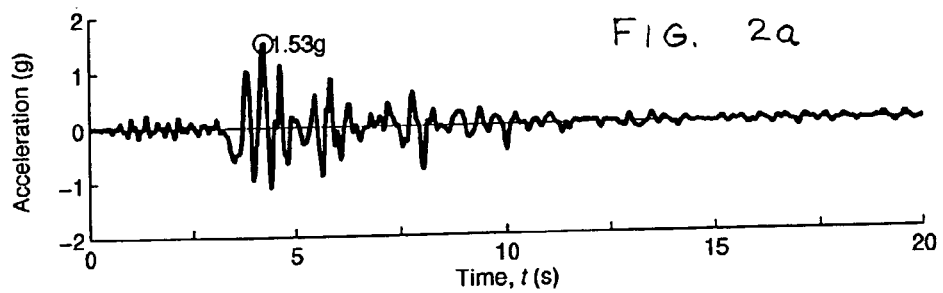
FIG. 2($a$) shows the acceleration history of the roof of a six-story hospital building shaken by the 1994 Northridge, California earthquake.
Figure 2B:
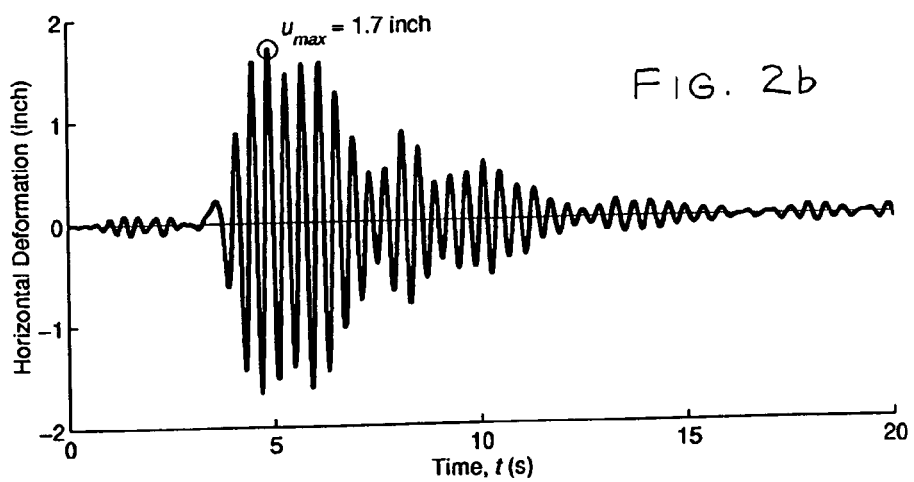

FIG. 2a shows the acceleration history at the roof of a 6-story hospital building shaken by the 1994 Northridge, California earthquake (California Strong Motion Instrumentation Program 1994, Station # 24514). FIG. 2b shows the load history in a brace supporting a 40-foot length of 2.5-inch water-filled steel pipe, subjected to the motion shown in FIG. 2a. The dynamic response of the pipe was determined from the solution of an elastic single-degree-of-freedom system of natural period equal to the period of a pipe held rigidly at both ends, and damping equal to 5% of critical. The suitability of assuming 5% damping under strong shaking will be discussed hereinafter. It is assumed that the nonlinearity in the brace will not affect the dynamic response of the system to an extent that the response cannot be estimated by an equivalent-linear analysis. This is a reasonable assumption considering that, in most cases, the plastic yielding in the brace will be small compared to the deformation in the pipe.

For illustration purpose, an effective horizontal stiffness of 1,000 lb/inch for all values of load is assumed. This gives the deformation history shown in FIG. 2b. As will be described hereinafter, the assumption of load-independent horizontal stiffness gives a conservative estimate of the number of load cycles, and the assumed value of the horizontal stiffness does not affect the number of cycles.

Because the brace pipe 12 and the fasteners 18 are generally very stiff compared to the pipe-attached and the building-attached components, most of the deformations plotted in FIG. 2b take place in the pipe-attached and building-attached components 14 and 16. Also, during strong shaking, the deformation results mainly from plastic yielding. It will be shown hereinafter that this assumption also provides a conservative estimate of the number of load cycles. Each of the deformation cycles shown in FIG. 2b does some damage to the brace components. Larger cycles do more damage than smaller cycles. Since the load is of short duration (usually less than one minute) and involves plastic deformations, a low-cycle fatigue approach is appropriate.

Coffin and Manson independently proposed in 1954 the following expression for the number of uniform-amplitude cycles to failure:

$$N_f = \frac{1}{C \cdot u^c} \quad (1)$$

where, u is the plastic deformation, and C and c are constants that are determined from experiments (Coffin, L. F., Jr. A Study of the Effects of Cyclic Thermal Stresses in Ductile Metals, *Transactions of ASME*, Vol. 76, pp. 931–950, 1954, and Manson, S. S. Behavior of Materials under Conditions of Thermal Stress, NACA TN 2933, 1954). Assuming that each cycle contributes equally to the damage, the damage done by a cycle of amplitude u is:

$$D = \frac{1}{N_f} = C \cdot u^c \quad (2)$$

The damage caused by a non-uniform deformation history of the type shown in FIG. 2b can be computed by summing up the damage caused by cycles of different amplitudes, as per Miner's rule (1945), i.e., $$D = C \cdot \sum_{i=1}^{n} u_i^c \quad (3)$$

in which D=1 implies complete damage (fatigue-failure), and n is the total number of cycles (Miner, M. A. Cumulative Damage in Fatigue, *Journal of Applied Mechanics*, Vol. 12, Trans. ASME, Vol. 67, pp. A159–A164, 1945).

Because the deformation histories are unlikely to contain symmetric cycles (with equal positive and negative amplitudes), it was decided in the present invention to accumulate damage from each half-cycle instead of each full-cycle. The damage expression (Equation 3) may then be rewritten as:

$$D = \frac{C}{2} \cdot \sum_{i=1}^{2n} u_i^c \quad (4)$$

where, $u_i$=the deformation amplitude of the ith half-cycle and n is now the number of half-cycles.

In the above model, the load-sequence effects (i.e., relative occurrence of small-amplitude cycles with respect to the large-amplitude cycles) are ignored. No conclusive evidence has been found to suggest that the load-sequence is important in low-cycle fatigue. The above model does not specify the frequency at which the load is applied. The loading frequency that gives the most conservative estimate of cyclic strength is determined in the test program described later herein.

There are several uniform-amplitude deformation histories that will cause the same damage as the non-uniform deformation history shown in FIG. 2b. However, if the amplitude of the uniform deformation history is kept the same as the maximum amplitude ($u_{max}$) of the non-uniform deformation history, then there exists only one uniform-amplitude deformation history that causes the same damage as the non-uniform deformation history shown in FIG. 2b. The only parameter that remains to be determined is the number of cycles in the uniform-amplitude deformation history. Dividing D (Equation 4) by the damage caused by a full-cycle of the largest amplitude $u_{max}$ gives the equivalent number of cycles (of amplitude $u_{max}$) that cause the same damage as the entire deformation history, i.e., $$N = \frac{1}{2} \cdot \sum_{i=1}^{2n} \left(\frac{u_i}{u_{\max}}\right)^c \qquad (5)$$

Tests performed on steel samples have shown that the damage exponent c is approximately equal to 2 (Krawinkler, H., Zohrei, M., Lashkari-Irvani, B., Cofie N. G., and Hadidi-Tamjed, H. Recommendation for Experimental Studies on the Seismic Behavior of Steel Components and Materials, *Report No. NSF/CEE*-83320, Stanford University, Stanford, Calif., September 1983; and Boyer, H. E. *Atlas of Fatigue Curves*, American Society of Metals, OH, 1999). Applying Equation 5 to the deformation history shown in FIG. 2 gives N=6.5.

Figure 3:
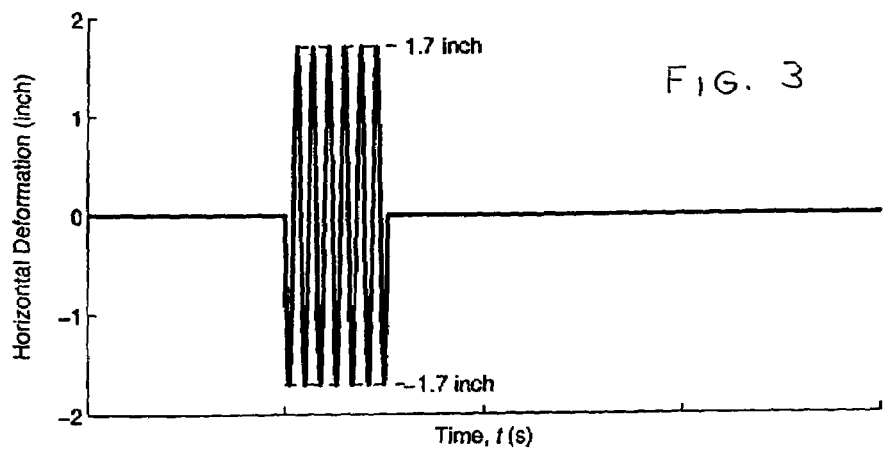
FIG. 3 shows a uniform-amplitude deformation history, with an arbitrary time scale, that will do the same damage as the deformation history of FIG. 2($b$)

In other words, the uniform-amplitude deformation history shown in FIG. 3 causes the same amount of damage as the deformation history shown in FIG. 2b. The amplitude in FIG. 3 is the same as the maximum amplitude in FIG. 2b. The time scale in FIG. 3 is arbitrary because the load frequency that gives the most conservative estimate of strength remains to be determined.

Figure 4:
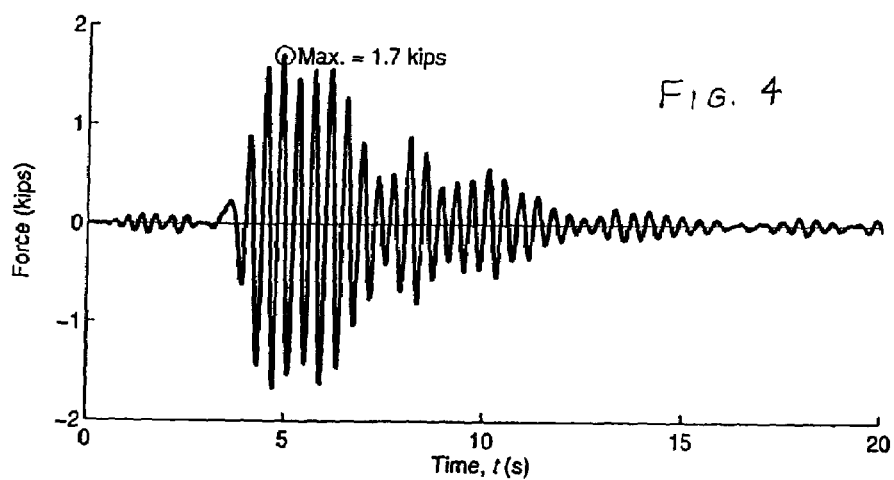
FIG. 4 shows the horizontal force in a brace supporting a 40-foot length of a 2.5-inch water-filled steel pipe subjected to the motion shown in FIG. 2($a$)

In determining the deformation history shown in FIG. 2b from the force history shown in FIG. 4, it was assumed that the stiffness remains the same, irrespective of the load. In reality, however, the stiffness is load-dependent. It decreases with increase in load. The use of load-dependent stiffness reduces the amplitude of small deformation cycles with respect to the maximum deformation $u_{max}$. This, in turn, reduces the equivalent number of cycles with maximum amplitude (Equation 5). Therefore, the assumption of load-independent stiffness in this study is conservative, because it gives a higher estimate of the number of load cycles.

As per the Coffin-Manson model (Equation 1), the damage is caused by plastic deformations only. However, the deformations shown in FIG. 2b are the sum of elastic and plastic deformations. If the elastic deformations are removed from the deformation history, the amplitudes of small cycles decrease more than those of large cycles, because elastic deformations are a relatively large part of the small-amplitude cycles. Also, many small amplitude cycles are completely removed, because they do not have any plastic component. This, too, reduces the equivalent number of cycles. Therefore, the assumption that all the deformation is plastic is conservative for estimating the fatigue demand.

Figure 5:
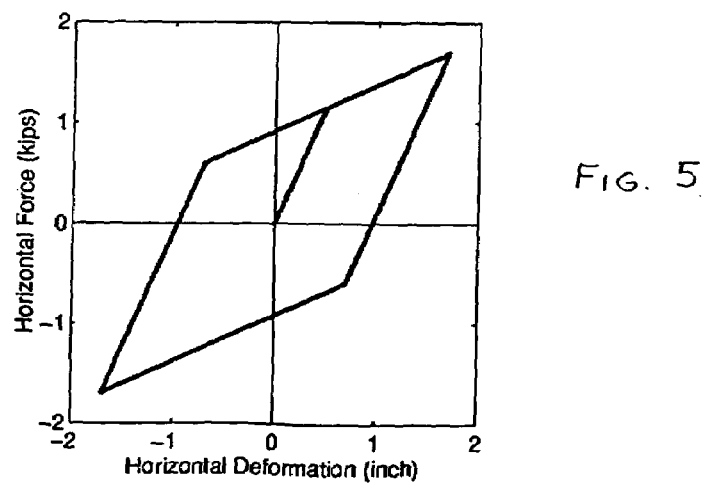
FIG. 5 shows the assumed non-linear force-deformation relationship for the brace of FIG. 1, wherein the brace has an effective stiffness at maximum deformation of 1 kip/inch.
Figure 6:
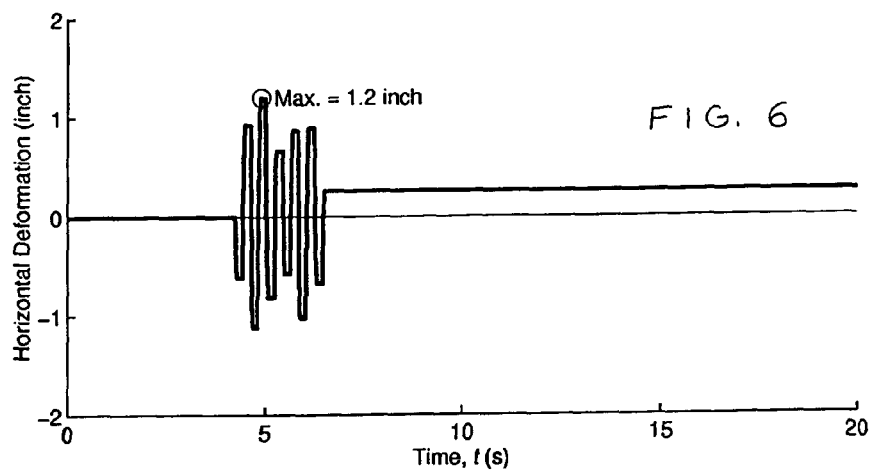
FIG. 6 shows the history of plastic deformation in the brace of FIG. 1 obtained by using the force-deformation relationship of FIG. 5 with the load history of FIG. 4.

To illustrate the above arguments, a bilinear elastic-plastic force-deformation relationship for the brace is assumed, as shown in FIG. 5. Using this with the load history in FIG. 4 gives the plastic deformation history shown in FIG. 6. Note that the shape of this history is significantly different from the shape of the deformation history shown in FIG. 2b. Hence, it will result in a different number of uniform cycles.

Applying Equation 5 to the deformation history shown in FIG. 2b, determines the equivalent number of uniform amplitude cycles to be N=3, which is less than half the value of 6.5 obtained earlier. Therefore, the simplifications made by the present invention yield conservative estimates of the number of cycles.

Equation 5 shows that the number of uniform-amplitude cycles depends on the shape rather than the amplitude of the deformation history. For the same ground motion, the shape of the deformation history in a building depends on (1) the type of building, (2) the location (height) of the piping within the building, and (3) the natural period of the piping. The ground motion depends on (1) the earthquake magnitude, (2) the distance from the source, and (3) the local soil conditions. The uncertainties in all of the above factors, affecting the number of cycles, were addressed by using a statistical approach.

Figure 7:
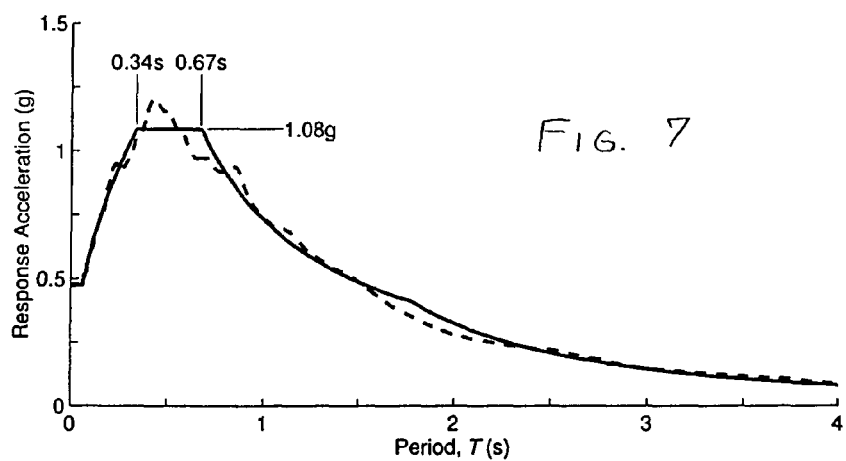
FIG. 7 shows the average 5% damped spectra of 32 strong-motion records from 18 buildings of various types located 7 to 32 km from the epicenter of the 1994 Northridge, California earthquake.

The uncertainties in building type and location (distance from earthquake source) are addressed by choosing 32 strong-motion records from 18 buildings (3 to 54 stories high) of various structural types, located 7 to 32 km from the epicenter of the 1994 magnitude 6.7$M_W$ Northridge earthquake. The average spectra of roof motions from these buildings are shown in FIG. 7. The actual spectrum is shown by a dashed-line and the smooth spectrum is shown by a solid-line. The smooth spectrum is a Newmark-Hall type spectrum fitted through the actual spectrum by the least-square method as described in Newmark, N. M., and Hall, W. J. *Earthquake Spectra and Design*, Earthquake Engineering Research Institute, Oakland, Calif., pp. 35–36, 1982.

The uncertainty in the period of the piping system is addressed by estimating the periods of sprinkler pipes of various diameters and spans. These periods are found to range between 0.02s and 0.5s.

The natural period of lateral vibration of pipe can be computed from the following equation:

$$T = \frac{2\pi L^2}{4.73^2} \cdot \sqrt{\frac{\mu}{EI}} \qquad (6)$$

where,
T=natural period
L=length of pipe between supports
E=Young's modulus of elasticity (29000 ksi for steel)
I—Area amount of inertia=$\pi(D^4-d^4)/64$, where D and d are outer and inner diameter, respectively
m—mass per unit length of pipe.

The uncertainty in location within the height of the building is addressed by selecting only roof records which have the longest duration and hence give the maximum number of cycles. The adjustment made for an earthquake magnitude larger than 6.7$M_W$ is discussed hereinafter.

Figure 8:
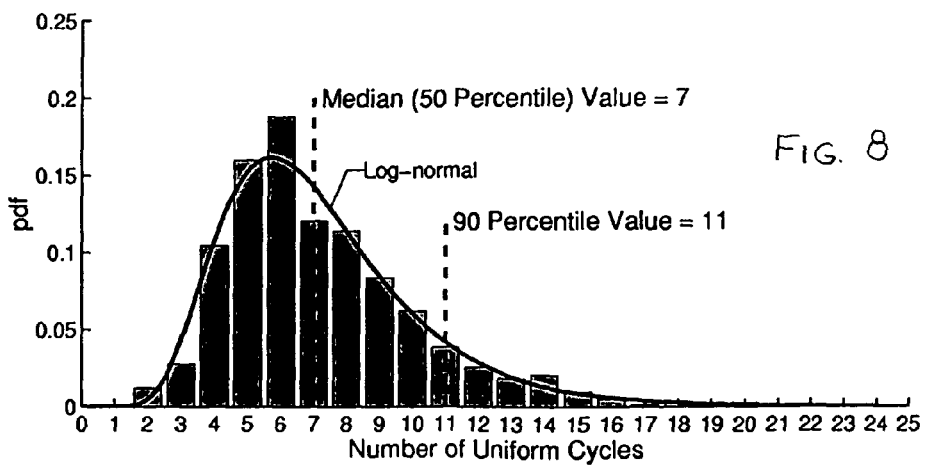
FIG. 8 is a histogram for the number of cycles associated with FIG. 7.

Twenty-five values of period were selected in the range 0.02 seconds to 0.5 seconds. These were considered to adequately represent the period of all sprinkler systems. For each period, the number of cycles was computed for the 32 strong-motion records, i.e., 25×32=800 values of number of cycles. FIG. 8 shows a histogram for the number of cycles. The median (50$^{th}$ percentile) value of the number of cycles is 7 and the 90$^{th}$ percentile value is 11, i.e., only 10 percent of the time is the number of cycles greater than 11. FIG. 8 also shows a plot of a lognormal distribution that has the same mean and standard deviation as the number of cycles. It is interesting to note that the number of cycles follows a lognormal distribution quite closely.

The Northridge earthquake had a magnitude of 6.7M$_W$. In regions of high seismicity, the design earthquake (e.g., 475-year return period) may be larger than magnitude 6.7M$_W$. A larger magnitude earthquake will result in longer duration of ground shaking, hence a larger number of cycles. There are many definitions of strong-motion duration, but the most common is the bracketed-duration, which is defined as the elapsed-time between the first and the last exceedances of threshold acceleration of 5% g, as is described in Bolt, B. A. Duration of Strong Motion, *Proc. 4th World Conf on Earthquake Engrg.*, Santiago, Chile, pp. 1304–1315, 1969. The bracketed-duration for a magnitude 7.2M$_W$ earthquake is roughly 40 percent more than that for a magnitude 6.7M$_W$ (Northridge) earthquake as is described in Chang, F. K., and Krinitzsky, E. L. Duration, Spectral Content, and Predominant Period of Strong Motion Earthquake Records from Western United States, *Miscellaneous Paper* 5-73-1, U.S. Army Corps of Engineers Waterways Experiment Station, Vicksburg, Miss., 1977. Further, assuming that the number of cycles is proportional to duration, the 90$^{th}$ percentile value of the number of cycles at the roofs of buildings for a 7.2M$_W$ earthquake is 11×1.4=15. For most sites, the design (475-year return period) earthquake will not be greater than 7.2M$_W$. Therefore, the number of cycles that has a 10% chance of being exceeded in 50 years is 15. Due to the conservative assumptions made in every step of the analysis, 15 cycles are expected to be sufficient for earthquake magnitudes even higher than 7.2M$_W$.

Thus, it has been established by the present invention that, for a component to be rated for a certain load, it must resist that load for 15 cycles without failing structurally or functionally. In other words, a component should not break (structural failure) nor should it undergo excessive deformation (functional failure) at the rated load applied for 15 cycles.

Horizontal deformation greater than 2 inches at brace locations is considered excessive based on the clearance requirements for sprinkler piping. For example: (1) a minimum of 2 inches clearance is required between the pipe and the structural members, and (2) at wall penetrations with large-diameter piping, the hole diameter is required to be 4 inches larger than the pipe diameter, according to National Fire Protection Association (NFPA). Installation of Sprinkler Systems, NFPA-13, Quincy, Mass., 1996. FIGS. 9a–9d, respectively, show that a 2-inch horizontal displacement can result from a 1-inch brace deformation for a 30° orientation, 1.41-inch brace deformation for a 45° orientation, 1.73-inch brace deformation for a 60° orientation, or a 2-inch brace deformation for a 90° orientation. It is assumed that the brace is free to rotate at its attachment point with the building. This is reasonable because building-attached components, such as the component 16 of FIG. 1, do allow free rotation because it helps installation. It is also assumed that the pipe is constrained in the vertical direction by hanger rods 30 (FIG. 10), which are typically at a much closer spacing than the braces. In the absence of information as to how much the hanger rods 30 will flex, this too is considered a practical assumption.

The deformation of the brace 10 is a result of deformations in the pipe-attached component 14, the building-attached component 16, the brace-pipe 12, and the fastener 18 (see FIG. 1). Assuming that the fastener 18 and the brace-pipe 12 contribute negligibly to the brace deformation, the brace 10 will perform adequately if the building-attached and the pipe-attached components 16 and 14 each contribute no more than half the allowable deformation. For example, a 2-inch horizontal deformation (for 30° orientation) corresponds to a 1-inch deformation along the brace 10, which allows a 0.5-inch deformation in the pipe-attached component 14 and a 0.5 inch deformation in the building-attached component 16.

A component (pipe-attached or building-attached) can be rated for a load F if it can resist the load F for 15 cycles without breaking or exceeding these deformation limits:

$$\bar{\delta} = \begin{cases} 0.5 \text{ inch} & \text{for } \theta = 30° \\ 0.71 \text{ inch} & \text{for } \theta = 45° \\ 0.87 \text{ inch} & \text{for } \theta = 60° \\ 1 \text{ inch} & \text{for } \theta = 90° \end{cases} \quad (7)$$

where, θ is the brace angle measured from the vertical (FIG. 10). Thus, the limiting deformations change from one orientation to another. Therefore, the load rating will be different for different orientations.

There are two options to conduct cyclic tests: (1) in force-control, or (2) in deformation-control. In force-control, a uniform-amplitude force history is applied and the resulting deformation history measured, while in deformation-control, a uniform-amplitude deformation history is applied and the resulting force history measured. For a test specimen that can undergo sudden changes in stiffness, it is difficult to achieve a good quality of 'control' in force-control. Therefore, the initial series of tests is conducted in deformation-control.

Because the brace components generally have different stiffness in tension and compression, a symmetric deformation history (with identical positive and negative amplitudes) does not result in a symmetric force history, and likewise a symmetric force history does not result in a symmetric deformation history. Therefore, it needs to be determined whether the force history or the deformation history should be kept symmetric.

As can be appreciated from FIG. 10, the braces 10 are loaded by the vibrating sprinkler-pipe 20. Relative to the pipe 20, the brace 10 is so stiff that the unequal stiffness of the brace (in tension and compression) does not affect the pipe response. Furthermore, since the pipe 20 has no directional sensitivity, it is reasonable to assume a symmetric force history (which may result in an unsymmetric deformation history) for the brace 10.

Testing is undertaken to gain insight into the cyclic behavior of brace components. Primary objectives of the test program are to evaluate (1) scatter in test results, (2) effect of load-rate (frequency), (3) effect of load-angle (orientation), and (4) degradation in strength, stiffness, and energy dissipation. In one test program, a total of 144 (66 monotonic+78 cyclic) tests were conducted.

Figure 11:
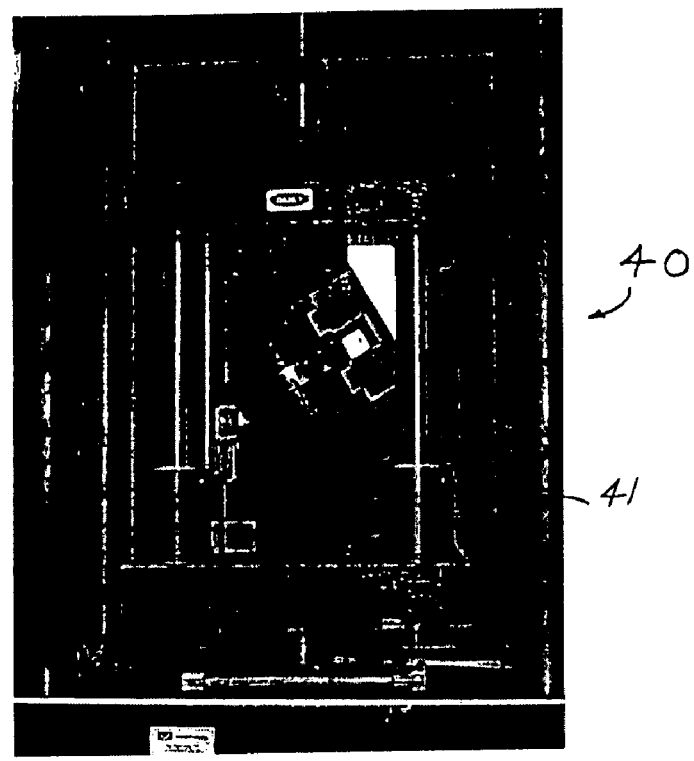
FIG. 11 is a front elevation of a pipe-attached brace component ready for testing at a 60° orientation in a testing apparatus.

As can be seen from FIG. 11, a servo-hydraulic machine 40, of a known type, such as a servo-hydraulic machine capable of applying 4-inch deformation in monotonic tension and compression, and 0.5-inch cyclic deformation at 5 Hz, is used in the tests. A "die-set" 41 was designed and constructed to grab the two ends of the components. FIG. 11 shows a component 42 in the die-set 41 ready for testing in the servo-hydraulic machine 40. The load is applied in the direction of the brace (vertical) by moving the bottom plate of the die-set 41 with an actuator, while the sprinkler pipe (inclined) is held in position. The load is measured by a load cell (not shown) placed above the top plate of the die-set 41, which remains stationary during the tests. The deformation is measured by an LVDT (Linear Variable Differential Transformer) inside the machine. The LVDT and the load cell are calibrated before the tests. As can be appreciated from the orientation of the pipe section in the die-set of FIG. 11, the component in FIG. 11 is being tested at an angle at which the component would resist longitudinal movement of the pipe 20, an angle similar to that of the brace 10 at the right end of FIG. 10. All components are set up according to the manufacturers' specifications.

Figure 12:
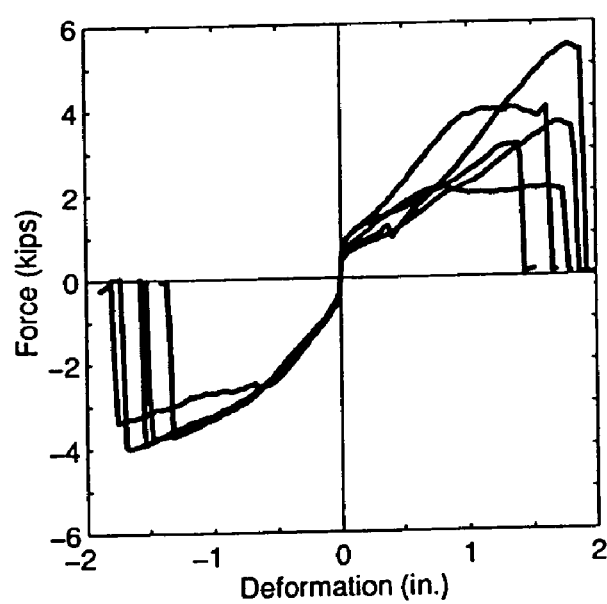
FIG. 12 shows monotonic force-deformation plots from 10 different samples of a pipe-attached component.

FIG. 12 shows the monotonic test results for 10 samples of a pipe-attached component P-1. Five samples were tested in compression and five were tested in tension. The scatter in force-deformation plots increases with increasing deformation. At a 0.5-inch deformation, which is the limiting deformation for 30° orientation (Equation 7), the load ranges from 1,220 lb to 2,200 lb in tension. The mean±σ (standard deviation) of load at 0.5-inch deformation is 1,600±400 lb in tension and 2,270±70 lb in compression.

Figure 13:
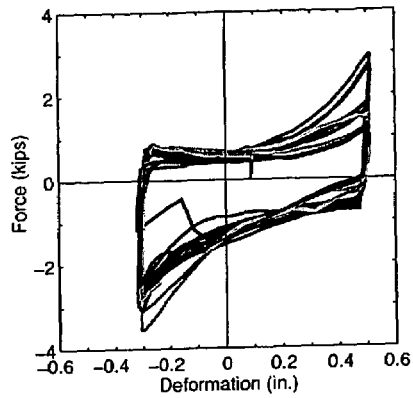
FIG. 13 shows force-deformation plots for five samples of pipe-attached components cyclically loaded at 0.1 Hz, only the last three of 15 cycles being shown.

FIG. 13 shows the results of slow cyclic tests (0.1 Hz) from 5 samples of the pipe-attached component P-1. The scatter is again significant. The mean±σ load in the $15^{th}$ cycle is 1640±640 lb in tension. Among the 78 tests conducted to evaluate the scatter, the coefficient of variation (standard-deviation÷mean) ranged from 0.02 to 0.47.

Figure 14A:
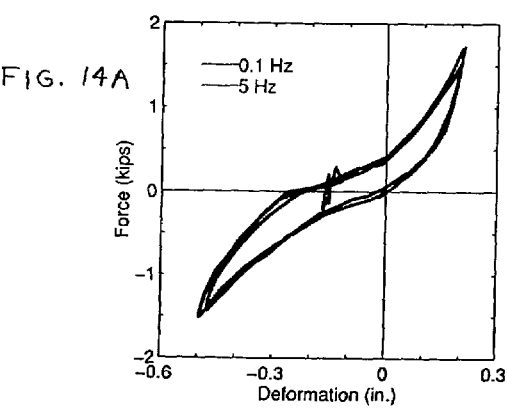
FIG. 14($a$) shows force-deformation plots for the last three of 15 cycles for a pipe-attached subassembly tested at 0.1 Hz and 5 Hz at a 60° orientation.
Figure 14B:
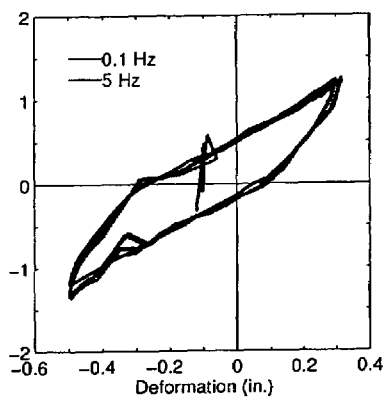

FIGS. 14A and 14B shows comparisons between 0.1 Hz and 5 Hz tests for a pipe-attached component P-2 in 60° and 90° orientations, respectively. The 5 Hz load is only slightly higher than the 0.1 Hz load. Similar observation was made in all 23 tests conducted to evaluate the effect of frequency on the strength of nonfriction-based components.

Figure 15:
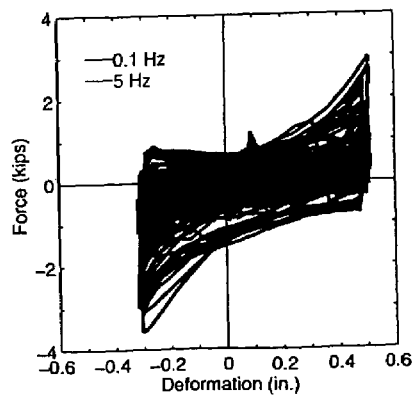
FIG. 15 shows force-deformation plots for five samples of pipe-attached components tested at 0.1 Hz and five samples of the components tested at 5 Hz.

FIG. 15 shows the force-deformation plots for 5 samples of the pipe-attached component P-1 tested at 0.1 Hz and 5 samples tested at 5 Hz. P-1 is a friction-based component, i.e., it derives its strength from friction along the pipe surface. The 5 Hz tests show smaller load resistance compared with 0.1 Hz tests. However, it is difficult to quantify the difference due to a lack of resolution in the 5 Hz data caused by an insufficient sampling rate. Similar observations were made in all 6 tests on friction-based components.

Figure 16:
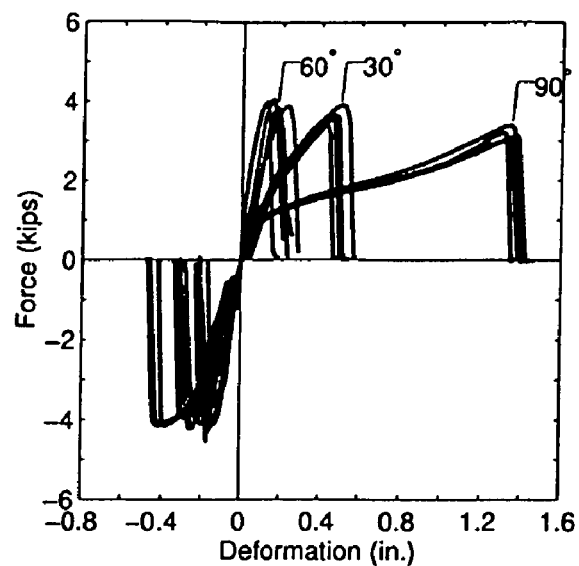
FIG. 16 shows monotonic force-deformation plots for a building-attached component in 30°, 60° and 90° orientations.

FIG. 16 shows monotonic tension and compression plots for different samples of a building-attached component B-1 tested in three different orientations. The component is much more flexible in the 90° orientation than in the 30° and 60° orientations. However, the ultimate load in the three orientations is not significantly different. This component is not expected to resist the limiting deformation in any orientation (Equation 7) for 15 cycles, given that it can barely sustain the limiting deformation under monotonic conditions (one-fourth cycle). It is assumed, as a first estimate, that the component can resist one-third the ultimate monotonic deformation under cyclic conditions. The mean load at one-third the ultimate tensile deformation differs by nearly 40% among the three orientations.

Figure 17A:
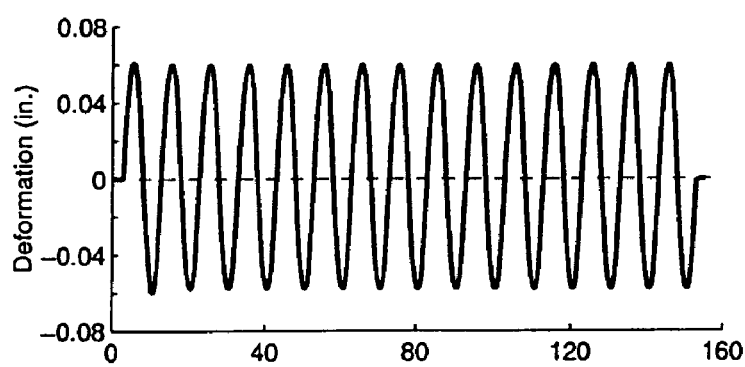
FIG. 17(a) is an applied deformation history for the building-attached component in the 60° orientation in FIG. 16.
Figure 17B:
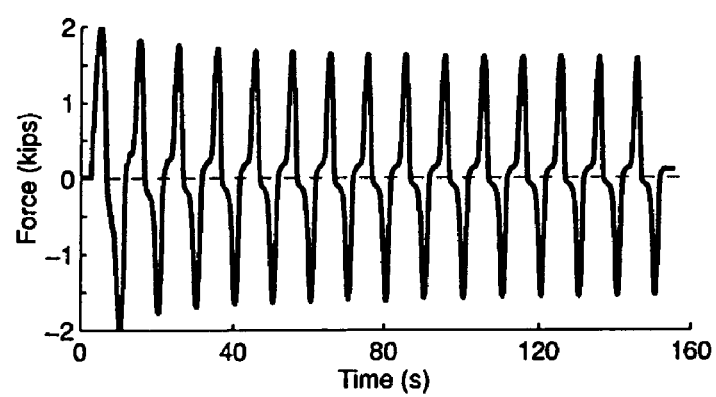
FIG. 17(b) is the measured force history for the building-attached component in a 60° orientation in FIG. 16.
Figure 18A:
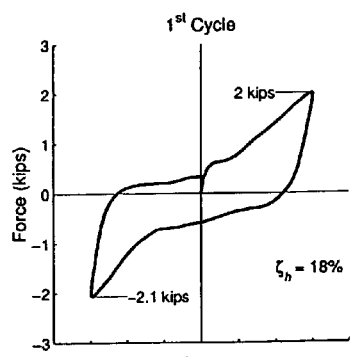
FIG. 18(a)–18(d) are force-deformation plots for the $1^{st}$, $2^{nd}$, $3^{rd}$, and $15^{th}$ cycles, respectively, for the building-attached component in the 60° orientation in FIG. 16.
Figure 18B:
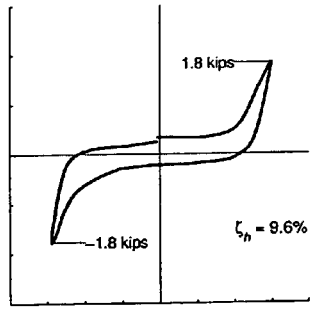
Figure 18C:
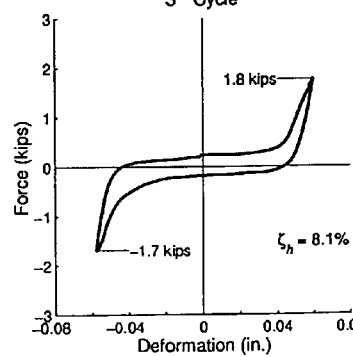
Figure 18D:
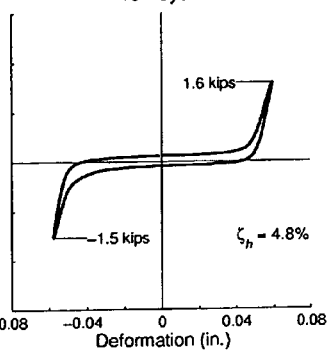

FIG. 17A shows the applied deformation history for building-attached component B-1 in the 60° orientation, and FIG. 17B shows the measured force history. From the first to the $15^{th}$ cycle, there is an approximately 20% reduction in load. The applied deformations were roughly 50% of the ultimate deformation, at which the load is maximum under monotonic conditions.

FIGS. 18A–18D shows the force-deformation plots (hysteresis loops) for the $1^{st}$, $2^{nd}$, $3^{rd}$, and 15th cycles, respectively, for the above test. Note that the size of the hysteresis loop (measure of energy dissipated per cycle) significantly decreases under cyclic loading. In these plots, hysteretic damping $\zeta_h$, computed from the size of the loop in accordance with Equation 3.9.2 of Chopra, A. K. *Dynamics of Structures: Theory and Application to Earthquake Engineering*, Prentice Hall, Englewood Cliffs, N.J., 1995, is also shown for various cycles. The damping decreases from 18% in the $1^{st}$ cycle to 4.8% in the $15^{th}$ cycle.

Figure 19A:
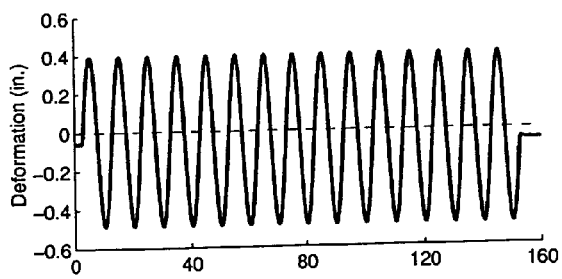
FIG. 19(a) is an applied deformation history for a pipe-attached component at a 30° orientation.
Figure 19B:
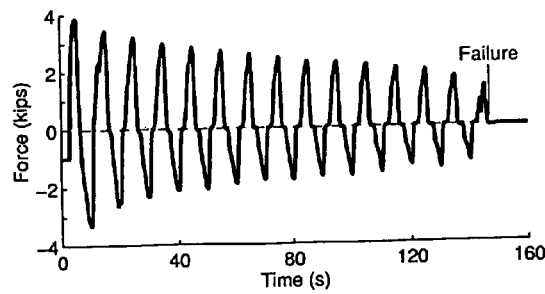
FIG. 19(b) is a measured force history for a pipe-attached component in a 30° orientation.

FIG. 19A shows the applied deformation history for pipe-attached component P-1 in a 30° orientation, and FIG. 19B shows the measured force history. This sample actually broke in the $15^{th}$ cycle. Its strength decreased from nearly 4000 lb in the first cycle to 0 lb in the last cycle. Therefore, the applied deformations were more than the sample could resist for 15 cycles. A deformation history with smaller amplitudes will show smaller degradation in strength. The applied deformations were roughly 50% of the ultimate deformation, at which the load is maximum under monotonic conditions.

The failure mode was different for monotonic and cyclic loading. Under monotonic loading, the failure occurred in the set-screw. However, under cyclic loading, the failure occurred in the pin.

In general, components showed significant degradation in strength (under cyclic conditions) whenever the applied deformation was more than one-third the ultimate deformation measured under monotonic conditions. For applied deformation less than one-third of the ultimate deformation, the degradation in strength from $1^{st}$ to $15^{th}$ cycle was less than 15%.

SUMMARY OF TEST RESULTS

The scatter in test results can range from very low for some tests to very high for other tests. For the tests conducted, the coefficient of variation ranged from 2 to 47 percent.

Components that rely, at least in part, on friction to secure the brace 10 to a building or an object appear to exhibit lower strength at higher frequencies. At least most pipe-attached components, including the pipe-attached component 14 of FIG. 1, are friction-based components. The building-attached component 16 illustrated in FIG. 1, including the fastener 18, is a non-friction based component. To obtain a conservative strength rating, friction-based components should be tested at the highest frequency the component might experience in an earthquake. As noted earlier, pipes can have a period between 0.02s and 0.5s (frequency between 2 and 50 Hz). However, as shown in FIG. 7, the load drops sharply below a period of 0.34s (or a frequency of 3 Hz). Therefore, friction-based components can be tested at 3 Hz frequency to obtain a conservative rating.

Components that do not derive their strength from friction exhibit greater strength at higher frequencies. Such components can be tested at a slow rate (e.g., 0.1 Hz) to obtain a conservative estimate of cyclic strength.

Based on the tests conducted, an orientation-independent cyclic strength of the components could not be guaranteed. Therefore, it was decided to test the components at four different orientations: 30°, 45°, 60°, and 90°.

Components used with larger diameter pipes showed more flexible response than similar components used with smaller diameter pipes. Components used with lower schedule (thinner wall) pipes showed more flexible response than those used with higher schedule (thicker wall) pipes.

Components showed significant degradation in strength (under cyclic conditions) whenever the applied deformation was more than one-third the ultimate deformation measured under monotonic conditions. For applied deformation less than one-third the ultimate deformation, the degradation in strength from $1^{st}$ to $15^{th}$ cycle was less than 15%.

Analysis of a particular brace component in a single orientation showed 18% hysteretic damping in the first cycle and 5% hysteretic damping in the $15^{th}$ cycle. The net damping in the piping system will be different depending on what fraction of the total deformation takes place in the brace and what fraction takes place in the pipe. However, a 5% damping for the piping system under strong shaking is not considered too high.

The failure modes under monotonic and cyclic loadings can be significantly different.

Test Protocol

A test protocol was established to determine the load a brace component can resist for 15 cycles without breaking or deforming more than the limiting value given by Equation 7. The protocol consists of a series of monotonic tension, monotonic compression, and cyclic tests. The monotonic tension and compression tests are performed to gather data for the cyclic tests. The load rating is determined primarily from the results of the cyclic tests.

Monotonic Testing

Samples of each size and style of seismic sway-brace component to be tested are subjected to monotonic tests until either the sample fails, or the deformation exceeds 3.5 inch (89 mm). The monotonic tests are performed for four orientations: $\theta=30°$, $45°$, $60°$, and $90°$, unless it is obvious that the stress distribution in the component is independent of orientation.

The test fixture is set to the required installation angle $\theta=30°$, $45°$, $60°$, or $90°$). The seismic sway-brace component is assembled according to manufacturer's specifications, and the test assembly is installed in the test fixture of a testing apparatus. The test assembly is subjected to monotonic tension loading until either the component fails, or the deformation exceeds 3.5 inches (89 mm). The maximum load is designated as $F_t$ (see FIG. 20). As is common in modern testing apparatus, a computer associated with the testing apparatus applies and continuously records the deformation, continuously measures and records the forces corresponding with the deformation, and generates and prints out a curve like that of FIGS. 20–22. If the load continues to increase after a 3.5 inch (89 mm) deformation, the load at the 3.5 inch (89 mm) deformation is regarded as $F_t$. The deformation at which the sample breaks (load drops to zero) is regarded as $\delta_t$. If the component does not break prior to a 3.5 inch (89 mm) deformation, $\delta_t$ is assigned a value of 3.5 inches (89 mm). The tension test generates the right-side curve of FIG. 20. The test is repeated in compression with a fresh, identical sample of the component to generate the left-side curve of FIG. 20, and values of $F_c$ and $\delta_c$ are obtained, as in FIG. 20. Additional tests are conducted, using fresh samples, to generate right-side and left-side curves like those of FIG. 20 for each of the other installation angles $\theta$.

Cyclic Testing

The objective of the cyclic tests is to determine the maximum load a component can resist for 15 cycles without breaking or exceeding the deformation limits given by Equation 7. Based on the results of cyclic tests, the seismic sway-brace components are assigned horizontal load ratings at installation angles of $\theta=30°$, $45°$, $60°$, and $90°$.

Figure 21:
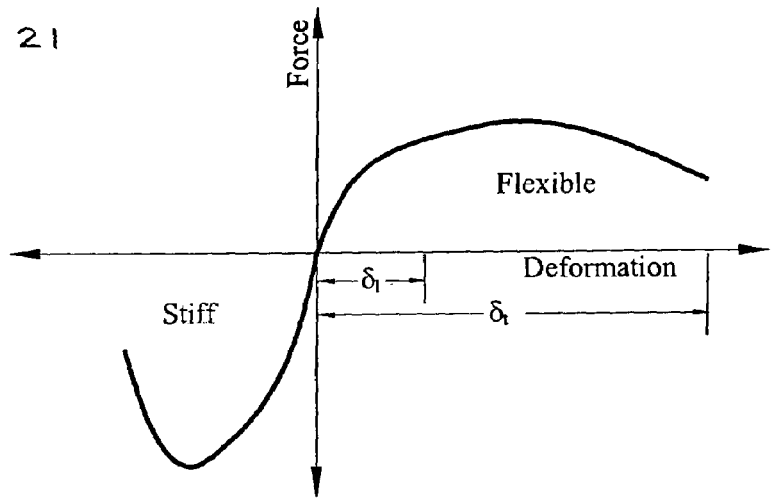
FIG. 21 is a second monotonic force-deformation sketch used in accordance with the present invention.

The following tests are performed using an appropriately sized load frame, or test apparatus 41, of, for example, the type shown in FIG. 11 with the table motion in deformation-control:

For the selected orientation ($\theta=30°$, $45°$, $60°$, or $90°$) and from the results plotted from the monotonic tension and compression tests, the flexible loading direction is identified by the more gradual slope of the data curve, as shown in FIG. 21. Note that the flexible loading direction may be in tension or compression, depending on the component design, but, in FIG. 21, the flexible loading direction is in tension.

Figure 20:
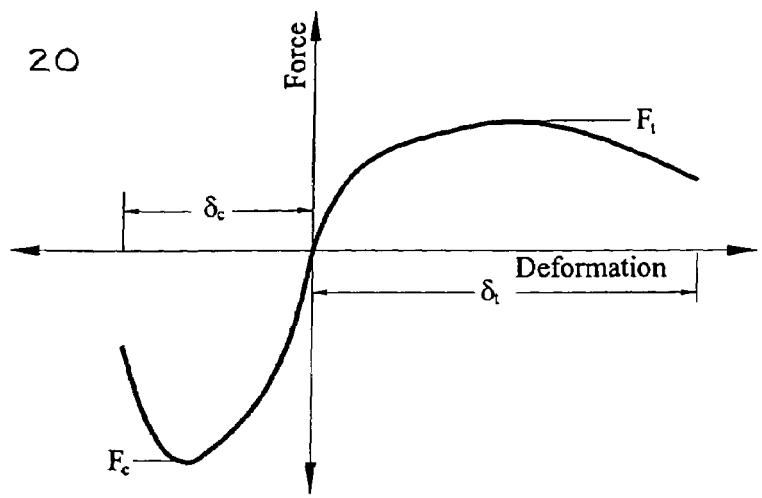
FIG. 20 is a first monotonic force-deformation sketch used in accordance with the present invention.

From the flexible loading direction, the test deformation $\delta_1$ the sample can resist for 15 cycles is estimated. Although not shown in FIGS. 20–22, scales are provided along the deformation and force axes to provide actual values of deformation and force for every point along the curves of those figures. As an initial estimate, $\delta_1$ is set equal to the smaller of a) one-third of maximum deformation on flexible side ($\delta_t$ or $\delta_c$) and b) the deformation limit $\bar{\delta}$ from Equation 7 for the appropriate angle. Once the value of the test deformation $\delta_1$ has been determined, the force-deformation plot of FIG. 20 is labeled as shown in FIG. 21.

Figure 22:
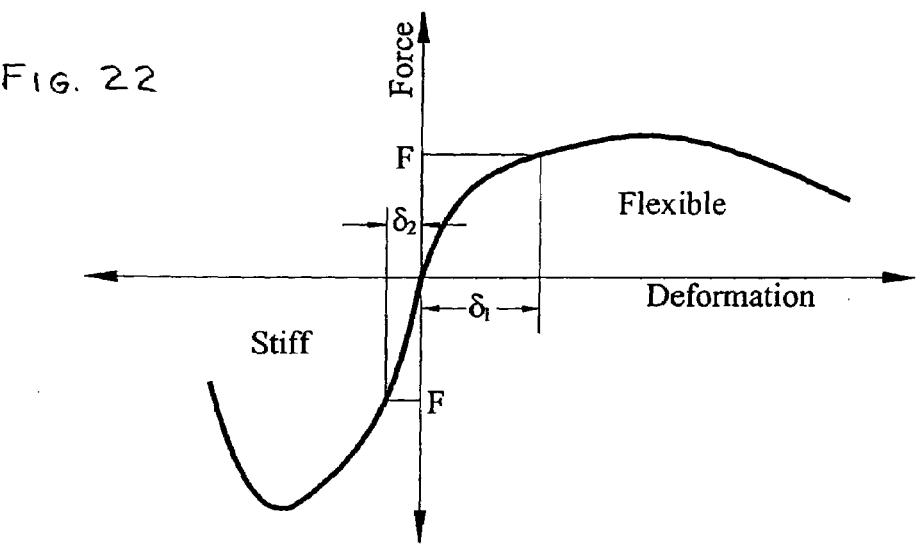
FIG. 22 is a third monotonic force-deformation sketch used in accordance with the present invention.

Using the labeled force-deformation plot of FIG. 21, the data curve is followed in the flexible direction to determine the force F that corresponds to the test deformation $\delta_1$, as in FIG. 22. The force F is recorded, and the stiffer loading direction curve is followed until the value of force F is located. Once the value of force F has been found on the stiffer loading curve, the deformation $\delta_2$ that corresponds to this point is determined.

A fresh sample is subjected to 15 cycles of unsymmetric deformation history ($\delta_1$ on the flexible side and $\delta_2$ on the stiff side, as determined above from FIGS. 21 and 22) at 0.1 Hz (3 Hz, if the sample is friction-based). The applied unsymmetric deformation history is recorded in a graph generated by the test apparatus, is similar to that of FIG. 17A, and is unsymmetric because the deformation applied in the flexible direction is greater than the deformation applied in the stiff direction, which is reflected by the amplitudes of peaks on one side of the horizontal zero deformation line being different from the amplitude of the troughs on the other side of the line.

Figure 23A:
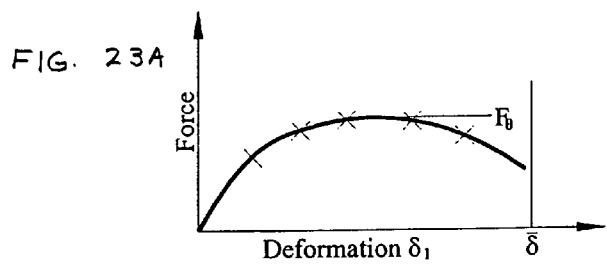
FIG. 23(a) is a cyclic force-deformation for a sample that breaks before reaching a predetermined limiting deformation.
Figure 23B:
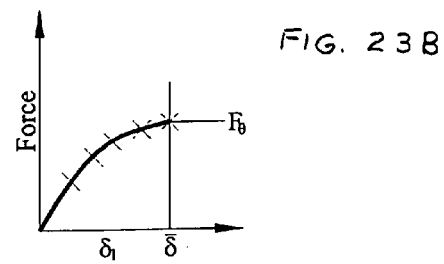
FIG. 23(b) is a cyclic force-deformation plot for a sample that does not break at the predetermined limiting deformation.

The test apparatus also generates a graph, similar to FIG. 19B, that is a record of a force history showing the forces associated with the deformations of the unsymmetric deformation history graph. The minimum force amplitude (tension or compression) during 15 cycles is read from the force history graph. On an X-Y chart, that force amplitude, which is for the deformation $\delta_1$, is marked as indicated by the leftmost "X" in FIG. 23A.

If $\delta_1$ is less than $\bar{\delta}$, more points on the cyclic force-deformation chart (FIG. 23A) are obtained by increasing $\delta_1$ by about 10% each time (and appropriately adjusting $\delta_2$ to keep the force history symmetric), until the sample breaks or $\delta_1$ approaches the limiting deformation $\bar{\delta}$. A fresh sample is used for each test.

The highest load on the force-deformation chart (FIG. 23A) is designated as $F_\theta$. The test is repeated two more times at the deformations corresponding to $F_\theta$, and the lowest of three values is designated as $F_\theta$. If $F_\theta$ is greater than two-thirds of the smaller of $F_t$ and $F_c$, $F_\theta$ is set equal to two-thirds of the smaller of $F_t$ and $F_c$.

The horizontal load rating at $\theta$ orientation is $H_\theta = F_\theta \cdot \sin \theta$.

Steps 1 to 8 are repeated for all four orientations. Four horizontal load ratings are assigned to the specimen ($H_{30}$, $H_{45}$, $H_{60}$ and $H_{90}$).

It will be apparent to those skilled in the art and it is contemplated that variations and/or changes in the embodiments illustrated and described herein may be made without departure from the present invention. Accordingly, it is intended that the foregoing description is illustrative only, not limiting, and that the true spirit and scope of the present invention will be determined by the appended claims.

The invention claimed is:

1. A method of testing a seismic brace for connecting an object to a fixed structure, comprising:
   applying a load to the brace in uniform-amplitude cycles simulating the forces due to an earthquake, wherein the number of uniform-amplitude cycles applied is based on the record of acceleration with respect to time of at least one building during an earthquake, wherein the brace has a stiff main member, a building-attached component for connecting the main member to a fixed structure, and an object-attached component for connecting the main member to an object to be braced, said building-attached component and said object-attached component having insignificant stiffness relative to the stiff main member, and
   the step of applying comprises applying the load in cycles to the building-attached component and to the object-attached component, the load being applied to the components independently of one another.

2. The method of claim 1, wherein the load is applied to the brace in approximately 15 cycles.

3. The method of claim 1, wherein the load is applied to each of the building-attached component and the object-attached component in approximately 15 cycles.

4. The method of claim 1, wherein the component has an orientation with respect to vertical when the component is in use in the brace, and the method comprises applying the load to the component in said orientation and at an angle with respect to vertical.

5. The method of claim 4, wherein the step of applying is repeated for a plurality of building-attached components identical to one another and for a plurality of object-attached components identical to one another, the load being applied to one of the building-attached components and one of the object-attached components at an angle of 300 to vertical, to another one of the building-attached components and another one of the object-attached components at an angle of 45° to vertical, to yet another one of the building-attached components and yet another one of the object-attached components at an angle of 60° to vertical, and to still another one of the building-attached components and to still another one of the object-attached components at an angle of 90° to vertical.

6. The method of claim 1, further comprising:
   determining a maximum permissible deformation, due to applying the load in cycles, for the building-attached component and for the object-attached component;
   measuring the forces applied to the building-attached component and the object attached component by the applying of the load in cycles;
   plotting said forces versus the deformations of the building-attached component and the object-attached component that the forces cause; and
   determining from the plot the load ratings of the building-attached component and the object-attached component.

7. The method of claim 5, further comprising:
   determining a maximum permissible deformation, due to applying the load in cycles, for the building-attached components and for the object-attached components for each angle at which the load is applied;
   measuring the forces applied to the building-attached components and the object-attached components by the applying of the load in cycles;
   plotting said forces versus the deformations of the building-attached components and the object-attached components caused by the forces; and
   determining from the plots the load ratings of the building-attached components and the object-attached components.

8. The method of claim 6, wherein the step of determining a maximum allowable permissible deformation due to applying the load in cycles comprises monotonically applying a load in both tension and compression to the building-attached component and to the object:attached component, the load being applied monotonically to the components independently of one another;
   measuring the forces applied monotonically to the building-attached component and the object-attached component in both tension and compression;
   plotting the forces applied monotonically versus the deformations of the building-attached component and the object-attached component caused by the forces applied monotonically to obtain data curves;
   selecting for each component, the data curve, either the data curve plotted for the tension load or the data curve plotted for the compression load, that has the gentler slope, the gentler slope indicating the flexible loading direction; and
   estimating from the selected data curves the deformations, due to applying the load in cycles, that the building-attached component and the object-attached component can resist.

9. The method of claim 8, wherein the step of determining a maximum allowable permissible deformation due to applying the load in cycles further comprises
   applying the load in cycles to each of a) a building-attached component identical to said building-attached component and b) an object-attached component identical to said object-attached component such that deformations in the components equal the deformations estimated in the estimating step;
   from the forces corresponding to the deformations applied in cycles, determining the minimum force for each component; and
   plotting the minimum forces versus the estimated applied deformations corresponding to the minimum deformations.

10. The method of claim 1, wherein the load is applied in cycles to a first sample of the brace, the method further comprising applying a load monotonically to a second sample of the brace that is substantially identical to the first sample.

11. A method of testing a seismic brace for connecting an object to a fixed structure, comprising:
   applying a load to the brace in uniform-amplitude cycles simulating the forces due to an earthquake, wherein the number of uniform-amplitude cycles applied is based on the record of acceleration with respect to time of at least one building during an earthquake, and wherein the load is applied in cycles to a first sample of the brace, the method further comprising applying a load monotonically to a second sample of the brace that is substantially identical to the first sample and additional applying steps each involving a respective brace identical to said brace, wherein the load applied monotonically is applied in a respective one of a plurality of directions, each defining an angle with respect to the longitudinal axis of the brace.

12. The method of claim 1, wherein a maximum permissible deformation is assigned to the brace, and the monotonically-applied force required to achieve the maximum permissible deformation is measured.

13. The method of claim 1, wherein the cycles are applied in a frequency of approximately 0.1 Hz where the component is nonfiction based and 3 Hz where the component is friction based.

14. A method of testing a seismic brace for connecting an object to a fixed structure, comprising:
applying a load to the brace in uniform-amplitude cycles simulating the forces due to an earthquake, wherein the number of uniform-amplitude cycles applied is based on the record of acceleration with respect to time of at least one building during an earthquake, and wherein the load is applied in cycles to a first sample of the brace, the method further comprising applying a load monotonically to a second sample of the brace that is substantially identical to the first sample and, wherein the step of applying a load monotonically comprises applying an increasing load monotonically in tension to a first sample of the brace until either the brace fails or deformation of the brace exceeds a predetermined permissible maximum, and applying an increasing load monotonically in compression to a second sample of the brace identical to the first sample until the brace fails or deformation of the brace exceeds a predetermined permissible maximum.

15. The method of claim 14, wherein data curves comprising values of the increasing monotonically applied force and associated values of deformation, one data curve each for tension and compression, are plotted on force-deformation coordinates, wherein one data curve has a more gradual slope than the other, and wherein the point, along the data curve having the more gradual slope, that corresponds to approximately one-third of either the predetermined permissible maximum deformation or the deformation at failure $\delta_1$ is determined from the plot, and the force F corresponding to the point is determined from the plot.

16. The method of claim 15, further comprising determining from the plot the point on the less gradual data curve that has a force equal to the force F, and determining from the less gradual data curve a deformation $\delta_2$ that corresponds to the point on the less gradual data curve having a force equal to the force F.

17. The method of claim 16, further comprising subjecting a third sample of the brace substantially identical to the first sample to approximately 15 cycles of loading to a deformation of $\delta_1$ in the direction, either the tension direction or the compression direction, with which the more gradual data curve is associated and to a deformation of $\delta_2$ in the direction with which the less gradual curve is associated.

18. The method of claim 17, wherein the third sample is subjected to approximately 15 cycles of loading at a frequency of approximately 3 Hz for a friction-based brace and approximately 0.1 Hz for a nonfiction-based brace.

19. A method of testing a component of a seismic brace for connecting an object to a fixed structure, comprising:
applying a load to the brace component in uniform-amplitude cycles simulating the forces due to an earthquake, wherein the number of uniform-amplitude cycles applied is based on the record of acceleration with respect to time of at least one building during an earthquake, wherein the component has an orientation with respect to vertical when the component is in use in the brace, wherein the method comprises applying the load to the component in said orientation and at an angle with respect to vertical, and wherein the step of applying is repeated for a plurality of components identical to one another, the load being applied to one of the components at an angle of 30° to vertical, to another one of the components at an angle of 45° to vertical, to yet another one of the components at an angle of 60° to vertical, and to still another one of the components at an angle of 90° to vertical.

20. The method of claim 19, wherein the load is applied to the brace component in approximately 15 cycles.

21. A method of testing a component of a seismic brace for connecting an object to a fixed structure, comprising:
applying a load to the brace component in uniform-amplitude cycles simulating the forces due to an earthquake, wherein the number of uniform-amplitude cycles applied is based on the record of acceleration with respect to time of at least one building during an earthquake;
determining a maximum permissible deformation, due to applying the load in cycles, for the component;
measuring the forces applied to the component by the applying of the load in cycles;
plotting said forces versus the deformations of the component that the forces cause; and
determining from the plot the load ratings of the component.

22. The method of claim 21, wherein the step of determining a maximum allowable permissible deformation due to applying the load in cycles comprises
monotonically applying a load in both tension and compression to the component;
measuring the forces applied monotonically to the component in both tension and compression;
plotting the forces applied monotonically versus the deformations of the component caused by the forces applied monotonically to obtain data curves;
selecting the data curve, either the data curve plotted for the tension load or the data curve plotted for the compression load, that has the gentler slope, the gentler slope indicating the flexible loading direction; and
estimating from the selected data curve the deformation, due to applying the load in cycles, that the component can resist.

23. The method of claim 19, wherein the load is applied in cycles to a first sample of the component, the method further comprising applying a load monotonically to a second sample of the component that is substantially identical to the first sample.

24. The method of claim 23, further comprising additional applying steps each involving a respective component identical to said component, wherein the load applied monotonically is applied in a respective one of a plurality of directions each defining an angle with respect to the longitudinal axis of the brace.

25. The method of claim 19, wherein a maximum permissible deformation is assigned to the component, and the monotonically-applied force required to achieve the maximum permissible deformation is measured.

26. A method of testing a component of a seismic brace for connecting an object to a fixed structure, comprising:
applying a load to the brace component in uniform-amplitude cycles simulating the forces due to an earthquake, wherein the number of uniform-amplitude cycles applied is based on the record of acceleration with respect to time of at least one building during an earthquake, and wherein the cycles are applied in a frequency of approximately 0.1 Hz where the component is nonfiction based and 3 Hz where the component is friction based.

27. The method of claim 23, wherein the step of applying a load monotonically comprises applying an increasing load monotonically in tension to a first sample of the component until either the component fails or deformation of the component exceeds a predetermined permissible maximum, applying an increasing load monotonically in compression to a second sample of the brace identical to the first sample until the component fails or deformation of the component exceeds a predetermined permissible maximum.

28. The method of claim 27, wherein data curves comprising values of the increasing monotonically applied force and associated values of deformation one data curve each for tension and compression are plotted on force-deformation coordinates, wherein one data curve has a more gradual slope than the other, wherein the point, along the data curve having the more gradual slope, that corresponds to approximately one-third of either the predetermined permissible maximum deformation or the deformation at failure $\delta_1$ is determined from the plot, and the force F corresponding to the point is determined from the plot.

29. The method of claim 28, further comprising determining from the plot the point on the less gradual data curve that has a force equal to force F, and determining from the plot the deformation $\delta_2$ that corresponds to the point on the less gradual data curve.

30. The method of claim 29, further comprising subjecting a third sample of the component substantially identical to the first sample to approximately 15 cycles of loading to a deformation of $\delta_1$ in the direction, either the tension direction or the compression direction, with which the more gradual data curve is associated and to a deformation of $\delta_2$ in the direction with which the less gradual curve is associated.

31. The method of claim 30, wherein the third sample is subjected to approximately 15 cycles of loading at a frequency of approximately 3 Hz for a friction-based component and approximately 0.1 Hz for a nonfiction-based component.

32. The method of claim 1, wherein the number of uniform-amplitude cycles applied is based on the records of acceleration with respect to time of a plurality of buildings during an earthquake.

33. The method of claim 32, wherein the number of uniform-amplitude cycles applied is based on the records of acceleration with respect to time of a plurality of buildings during the same earthquake.

34. The method of claim 19, wherein the number of uniform-amplitude cycles applied is based on the records of acceleration with respect to time of a plurality of buildings during an earthquake.

35. The method of claim 34, wherein the number of uniform-amplitude cycles applied is based on the records of acceleration with respect to time of a plurality of buildings during the same earthquake.

* * * * *